United States Patent [19]
Röhm

[11] Patent Number: 5,054,796
[45] Date of Patent: Oct. 8, 1991

[54] SELF-TIGHTENING HAMMER-DRILL CHUCK

[76] Inventor: Günter H. Röhm, Heinrich-Röhm-Str. 50, D-7927 Sontheim, Fed. Rep. of Germany

[21] Appl. No.: 557,386

[22] Filed: Jul. 24, 1990

[30] Foreign Application Priority Data

Aug. 18, 1989 [EP] European Pat. Off. ............ 89115229

[51] Int. Cl.⁵ .............................................. B23B 31/10
[52] U.S. Cl. ........................................ 279/60; 279/63
[58] Field of Search ...................... 279/1 K, 60, 61, 62, 279/63

[56] References Cited

U.S. PATENT DOCUMENTS 3,702,705 11/1972 Schadlich ................................ 279/62
4,955,623 9/1990 Kohm ..................................... 279/60

FOREIGN PATENT DOCUMENTS 2806797 8/1979 Fed. Rep. of Germany ........ 279/60

Primary Examiner—Daniel W. Howell
Attorney, Agent, or Firm—Herbert Dubno; Andrew Wilford

[57] ABSTRACT

A hammer-drill chuck has a chuck body, a sleeve rotatable but axially nondisplaceable on the chuck body, and a plurality of jaws engaged between the sleeve and chuck body. A locking-ring body is axially displaceable between a rear unlocked position and a front locking position on the chuck body. A pin is radially displaceable in and extends radially from one of the bodies toward the other body and this other body is formed with an angularly extending slot having angularly opposed and spaced end surfaces and with a plurality of angularly spaced abutments. Thus when the pin is engaged in the slot it limits relative angular displacement of the bodies. The other body also has an axially backwardly extending cutout opening axially forward into the slot adjacent one of the end surfaces thereof at a mouth having an angular dimension generally equal to the pin width. Thus the cutout only allows axial travel of the locking ring into its locked position when the pin is aligned axially with the cutout at the one end surface of the slot. A spring urges the pin radially toward the floor of the slot and the pin has an end interfittable with the abutments. The pin end and abutment are so shaped that the pin can move angularly in one direction along the slot but cannot move angularly in the opposite direction.

12 Claims, 2 Drawing Sheets 5,054,796

SELF-TIGHTENING HAMMER-DRILL CHUCK

FIELD OF THE INVENTION

The present invention relates to a drill chuck. More particularly this invention concerns a self-tightening chuck for a hammer drill.

BACKGROUND OF THE INVENTION

A standard self-tightening hammer-drill chuck that is rotated about an axis of a drill spindle to rotate a drill bit about and reciprocate it along the axis has a chuck body securable to the spindle and formed centered on the axis with a screwthread. A sleeve rotatable but axially nondisplaceable on the chuck body is formed angularly equispaced about the axis with a plurality of angled jaw guides, although it is possible to form the guides on the chuck body and the screwthread on the sleeve for the same effect. Respective jaws in the guides have racks that mesh with the screwthread so that rotation of the sleeve body on the chuck body about the axis in a tightening direction moves the jaws radially together and opposite rotation in a loosening direction moves the jaws radially apart. The normal clockwise (seen from behind the tool) rotation of the drill chuck creates reaction forces in the chuck which tend to rotate the sleeve in the tightening direction for automatic self-tightening action.

As described in my copending patent application Ser. No. 07/429,843 filed Oct. 31, 1989 (now U.S. Pat. No. 4,955,623) a locking ring is provided that is limitedly angularly displaceable relative to the chuck body. In addition this ring is formed with teeth or other formations that mesh axially with complementary formations on the sleeve and the ring is axially displaceable on the chuck body between a back unlocked position with the formations disengaged and relative rotation of the ring and sleeve possible, and a front position with the formations in mesh and such relative rotation impossible. The function of this ring is to prevent accidental opening of the chuck. The limited angular movement of the ring on the chuck body is necessary to allow the above-described self-tightening action to take place and is created by providing the ring or chuck body with a pin projecting radially into a slot on the other body that is of somewhat greater angular width than the pin.

With such an arrangement when a drill bit is to be chucked the locking ring is first pulled back, and then the sleeve is rotated in the unlocking direction, normally counter-clockwise as seen from axially behind the chuck, to spread the jaws sufficiently to accept the tool. Then the sleeve is rotated in the locking direction until the jaws snugly engage the shank of the tool, and finally the locking ring is pushed back forward so that its teeth engage those of the sleeve and impede it from rotating substantially on the chuck body.

In order to avoid that the locking ring is in its angular end position corresponding to engagement of its formation in the locking direction with the chuck body or vice versa, that is in such a position that it completely impedes further tightening of the chuck I provide in the system of my above-cited copending patent application a projection that is fixed in and extends radially from the chuck or locking ring toward the other body. The other body is formed with an angularly extending slot having angularly opposed and spaced end surfaces spaced apart angularly by a distance greater than the angular dimension of the projection and axially opposed and spaced side surfaces spaced axially by a distance generally equal to the axial dimension of the projection. Thus when the projection is engaged in the slot same limits relative angular displacement of the bodies. An axially backwardly extending cutout opens axially forward into the slot adjacent one of the end surfaces thereof at a mouth having an angular dimension generally equal to the axial dimension of the projection. Thus the cutout only allows axial travel of the locking ring into its locked position when the projection is aligned axially with the cutout at the one end surface of the slot.

With such a system the chuck can indeed self tighten during drilling. Nonetheless afterward it is possible for it to loosen again.

OBJECTS OF THE INVENTION

It is therefore an object of the present invention to provide an improved self-tightening chuck for a hammer drill.

Another object is the provision of such an improved self-tightening chuck for a hammer drill which overcomes the above-given disadvantages, that is which remains tight after self tightening.

SUMMARY OF THE INVENTION

A drill chuck for rotation about an axis of a drill spindle to rotate a drill bit about and reciprocate it along the axis has a chuck body securable to the spindle, a sleeve rotatable but axially nondisplaceable on the chuck body, a plurality of jaws engaged between the sleeve and chuck body, and angled guides and a screwthread formed on the body and sleeve. The jaws can be radially displaced toward each other on relative rotation of the sleeve and chuck body in a tightening direction and away from one another on opposite relative rotation in a loosening direction. A locking-ring body is axially displaceable between a rear unlocked position and a front locking position on the chuck body. The sleeve and locking-ring body have complementary axially open and projecting teeth fittable within each other to inhibit substantial relative angular movement of the ring body and sleeve about the axis only in the front locking position and these teeth are out of engagement with one another in the rear unlocked position. A pin is radially displaceable in and extends radially from one of the bodies toward the other body. The other body is formed with an angularly extending slot having angularly opposed and spaced end surfaces spaced apart angularly by a distance greater than the angular dimension of the pin and a plurality of angularly spaced abutments. Thus when the pin is engaged in the slot this slot limits relative angular displacement of the bodies. The other body also has an axially backwardly extending cutout opening axially forward into the slot adjacent one of the end surfaces thereof at a mouth having an angular dimension generally equal to the axial dimension of the pin. Thus the cutout only allows axial travel of the locking ring into its locked position when the pin is aligned axially with the cutout at the one end surface of the slot. A spring urges the pin radially toward the floor of the slot and the pin has an end interfittable with the abutments. The end and abutment are so shaped that the pin can move angularly in one direction along the slot but cannot move angularly in the opposite direction.

Thus with the system of this invention the pin, which can be mounted in the chuck body or locking ring, ratchets across the abutments in the slot and cannot return. The only way to return it is to retract it and move it back out of the slot and then to the starting end.

According to this invention the slot has a floor formed with the abutments. These abutments can take the form of steps each having a radially directed face and a radially extending edge in which case the pin has an end face flatly engageable with the step faces and a side edge flatly engageable with the step edges. Alternately the abutments can be a row of sawteeth constituting the abutments in which case the pin has an end formed with at least one sawtooth engageable with the abutment sawteeth.

DESCRIPTION OF THE DRAWING

The above and other objects, features, and advantages will become more readily apparent from the following, reference being made to the accompanying drawing in which.

SPECIFIC DESCRIPTION

Figure 1:
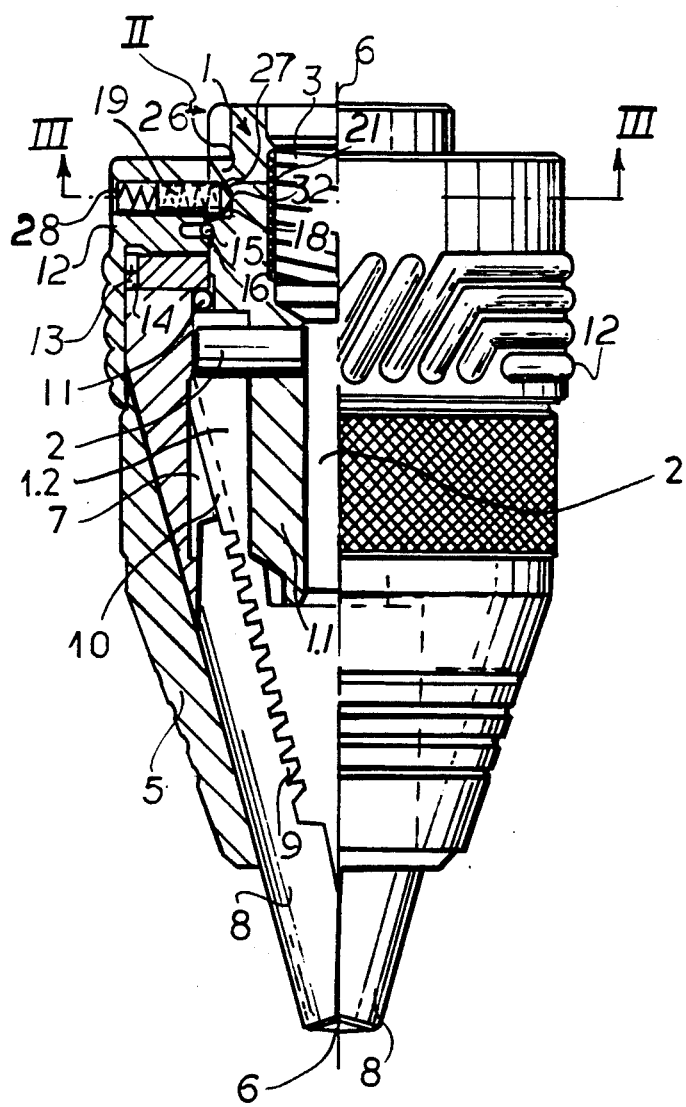
FIG. 1 is a side view partly in axial section through a chuck according to this invention.

As seen in FIG. 1 a chuck according to this invention has a chuck body 1 comprised of an inner part 1.1 that is formed centered on an axis 6 with a threaded bore 3 that is fitted over a one- or two-piece drill spindle, and an outer part 1.2. The parts 1.1 and 1.2 are rotationally coupled by coupling elements 2, here a pin set in radially aligned holes of the parts 1.1 and 1.2. The bore 3 is extended forward as a passage 4 so that, in the case of a two-part drill spindle, a central hammer rod of this spindle can engage the back of a drill bit held by the chuck.

A tightening sleeve 5 is rotatable but axially nondisplaceable on the outer part 1.2 and is formed with three angularly equispaced angled guides 7 each receiving a respective identical jaw 8 formed along its inner edge With a row of teeth 9 meshable with teeth 10 formed on the outside of the frustoconical lower end of the outer part 1.2 in each guide 7. The sleeve 5 bears axially forward via a roller bearing 11 on an axially backwardly facing shoulder of the part 1.2. The teeth 9 and 10 are angled so that rotation of the sleeve 5 in one direction on the body 1 will move the jaws 8 axially forward (down in FIG. 1) and radially toward each other, and opposite relative rotation will move them axially backward and radially apart. The angle is such that normal clockwise rotation of the drill bit tightens the jaws 8 on the drill bit. The bearing 11 ensures that the reaction forces of tightening the jaws 8 are transmitted from the part 1.2 to the sleeve 5. This self-tightening action is the same when the chuck body 1 is formed of one piece, that is when the two pieces 1.1 and 1.2 are unitary with each other.

A locking ring 12 centered like the sleeve 5 on the axis 6 is angularly displaceable on the chuck between two angularly offset end positions and is also axially limitedly displaceable between a back and a front position. The ring 12 and the sleeve 5 are formed with axially interengageable teeth 13 and 14 that fit together in the front position of the ring 12 to rotationally lock the sleeve 5 and ring 12 together. In an unillustrated back position the teeth 13 and 14 are out of engagement with each other. A spring 15 sitting in a radially inwardly open groove of the sleeve 5 can engage in either of two axially offset and radially outwardly open grooves 16 (only one shown) of the ring 12 to retain the ring 12 in the respective end positions without inhibiting relative rotation of the ring 12 and part 1.2.

The limits of angular travel of the ring 12 o the part 1.2 are defined by an angularly elongated slot 18 formed in the part 1.2 and a pin 19 projecting radially inward from the ring 12 and engaging in this slot 18. The ends of the slot 18 form abutments 20.1 and 20.2 for the pin 19 so that the relative angular movement is equal to the angular length of the slot 18 minus the diameter of the pin 19. In addition t he slot 18 has axially front and back edges that limit axial movement of the pin 19, and therefore of the ring 12, when the pin 19 is moved in direction 22 (FIG. 3) into one of its angular end positions which is the self-tightening position. At the opposite end of the slot 18 the part 1.2 is formed with an axially backwardly opening cutout or notch 24 opening into the slot 18 at a mouth 23 and having on surface 25.1 extending axially straight back from the surface 20.1 and another surface 25.2 flaring back at an acute angle of about 45 from the surface 25.1. Only when the pin 19 is aligned with this cutout 24 can the ring 12 be moved back into the decoupled position of FIGS. 3 and 4. The surface 25.2 ensures that when the locking ring 12 is pushed forward into the engaged position it will be at the end of the slot 18 with the surface 20.1, the part 1.2 being formed with a nose 26 that forces the pin 19 to the side if it is pushed axially forward.

The back edge of the outer end of the pin 19 and the front edge of the nose 26 are both chamfered at 27, and a spring 28 urges the pin 19 into the slot 18 or cutout 24. Thus it is possible to pull the ring 12 back into the release position regardless of the position of the pin 19 in the slot 18, such pulling-back simply forcing the pin 19 in against the force of its spring 28. On the other hand, the flank 25.2 and the front edge of the outer end of the pin 19 are not similarly chamfered, so that pushing the ring 12 forward when the pin 19 is axially aligned with this surface 25.2 will cam the ring 12 angularly back into the unlocked position so that it will enter the unlock end of the slot 18 at the surface 20.1. This ensures that when the chuck is locked the ring 12 always starts at the extreme rear end of its stroke.

Figure 3:
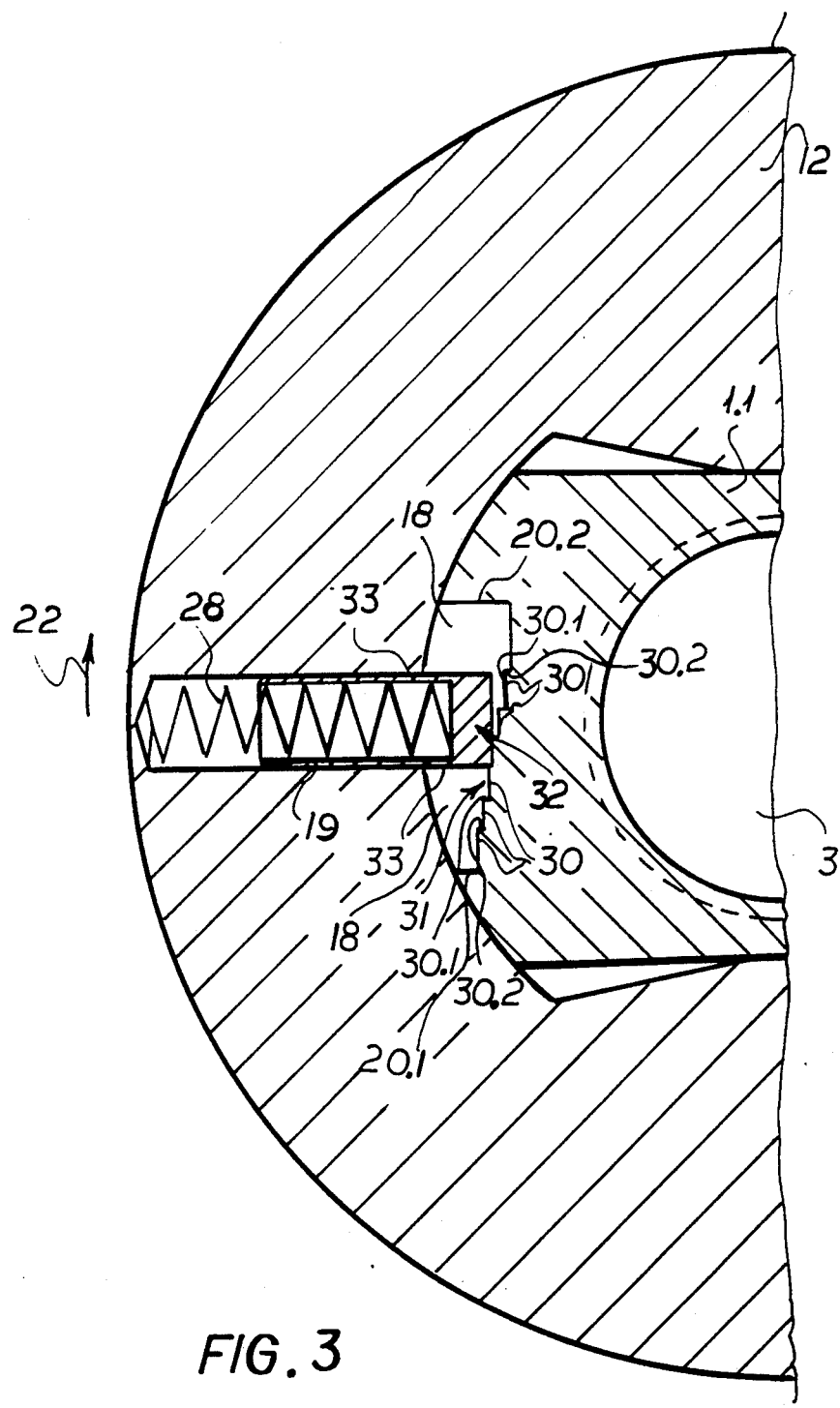
FIG. 3 is a large-scale cross section taken along line III—III of FIG. 1.

As seen in some detail in FIG. 3 the slot 18 has a floor formed with a plurality of abutments steps 30 each having a radially outwardly directed face 30.1 and a radially extending edge 30.2. The pin 19 has a flat end face 32 that can flatly abut the faces 30.1 and a side edge 33 that can flatly engage the edges 30.2, it being noted that this pin 19 is prevented from rotating in the sleeve 12 about its own radial axis.

Thus during normal self-tightening action the pin 18 will move from the flank 20.1 toward the flank 20.2. As it does this it will slip from each stop down to the adjacent step 30, moving ratchet fashion. The spring 28 prevents the pin 18 from moving radially back out, so that the chuck cannot untighten itself. The only way the pin 18 can be moved from the end of the face 20.2 to the end of the face 20.1 is by moving it axially up over the nose 26 and then pushing it back down in the cutout 24 to seat it at the end 20.1. The chuck according to this invention therefore tightens just like that described in my above-cited copending patent application, but cannot loosen.

Figure 2:
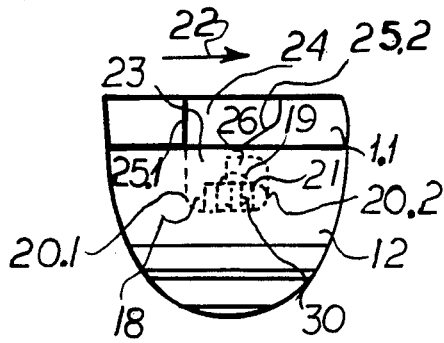
FIG. 2 is a side view of the detail indicated at arrow II of FIG. 1.
Figure 4:
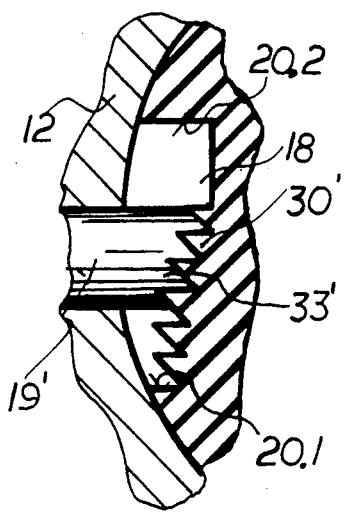
FIG. 4 is a detail view of a variant on the system of this invention.

In the arrangement of FIG. 4 the slot 18 is formed with sawteeth 30' constituting the abutments and a pin 19' has a sawtooth end complementary thereto. Thus the pin 19' can ratchet from the end 20.1 to the end 20.2 without moving radially inward, just with a short radial stroke with each move to the adjacent sawtooth 30'.

I claim:

1. A drill chuck for rotation about an axis of a drill spindle to rotate a drill bit about and reciprocate it along the axis, the chuck comprising:
    a chuck body securable to the spindle;
    a sleeve rotatable but axially nondisplaceable on the chuck body;
    a plurality of jaws engaged between the sleeve and chuck body;
    means including angled guides and a screwthread formed on the body, sleeve, and jaws for radial displacement of the jaws toward each other on relative rotation of the sleeve and chuck body in a tightening direction and for radial displacement of the jaws away from one another on opposite relative rotation in a loosening direction;
    a locking-ring body axially displaceable between a rear unlocked position and a front locking position on the chuck body, the sleeve and locking-ring body having complementary axially open and projecting teeth fittable within each other to inhibit substantial relative angular movement of the ring body and sleeve about the axis only in the front locking position, the teeth being out of engagement with one another in the rear unlocked position; and
    a pin radially displaceable in and extending radially from one of the bodies toward the other body and having a predetermined angular dimension, the other body being formed with
        an angularly extending slot having angularly opposed and spaced end surfaces spaced apart angularly by a distance greater than the angular dimension of the pin and a plurality of angularly spaced abutments, whereby when the pin is engaged in the slot same limits relative angular displacement of the bodies, and
        an axially backwardly extending cutout opening axially forward into the slot adjacent one of the end surfaces thereof at a mouth having an angular dimension generally equal to the axial dimension of the pin, whereby the cut-out only allows axial travel of the locking ring into its locked position when the pin is aligned axially with the cutout at the one end surface of the slot;
    a spring urging the pin radially toward the floor of the slot, the pin having an end interfittable with the abutments, the end and abutment being so shaped that the pin can move angularly in one direction along the slot but cannot move angularly in the opposite direction.

2. The drill chuck defined in claim 1 wherein the slot has a floor formed with the abutments.

3. The drill chuck defined in claim 2 wherein the floor is formed with steps each having a radially directed face and a radially extending edge, the pin having an end face flatly engageable with the step faces and a side edge flatly engageable with the step edges.

4. The drill chuck defined in claim 2 wherein the floor is formed with a row of sawteeth constituting the abutments, the pin having an end formed with at least one sawtooth engageable with the abutment sawteeth.

5. The drill chuck defined in claim 1 wherein the cutout has angularly spaced and axially extending edges forming a guide for the pin.

6. The drill chuck defined in claim 1 wherein the screwthread is angled such that tightening of the chuck corresponds to movement of the sleeve from the one end of the slot to the opposite end thereof.

7. The drill chuck defined in claim 1 wherein the pin has a chamfered end, the rear side surface of the slot being chamfered, whereby the pin can be axially displaced from the slot by camming of the pin into the one body by engagement of its chamfered end with the chamfered rear side surface.

8. The drill chuck defined in claim 7 wherein the edges of the cutout are squared and unchamfered, whereby the pin cannot be cammed in by engagement with the cutout edges.

9. The drill chuck defined in claim 1 wherein the edges of the cutout diverge axially rearward.

10. The drill chuck defined in claim 9 wherein one of the cutout edges extends at an angle of about 45° to a plane including the axis, the other cutout edge extending generally parallel to the plane and forming an axial rearward continuation of the one end surface of the slot.

11. The drill chuck defined in claim 1, further comprising
    retaining means engaged between the sleeve and the locking-ring body for releasably retaining same in the locking and unlocked positions.

12. The drill chuck defined in claim 1 wherein the chuck body includes an inner part and an outer part, the sleeve and ring body being mounted on the outer part.

* * * * *